United States Patent Office 3,389,143
Patented June 18, 1968

3,389,143
PURIFICATION OF 1,10-PHENANTHROLINES
Bert Halpern, Sunnyvale, Calif., and William G. C. Raper, Moorabbin, Victoria, Australia, assignors to Monsanto Chemical (Australia) Limited, a company of Australia
No Drawing. Continuation-in-part of application Ser. No. 310,934, Sept. 23, 1963. This application Dec. 13, 1966, Ser. No. 601,338
Claims priority, application Australia, Sept. 27, 1962, 22,636/62
5 Claims. (Cl. 260—288)

ABSTRACT OF THE DISCLOSURE

Purification of substituted 1,10-phenanthrolines by reacting the phenanthroline with an organic acid having a dissociation constant in the approximate range of $1 \times 10^{-4}$ to $1 \times 10^{-6}$, at 25° C.; partially neutralizing this solution by addition of a base until a slight permanent precipitation appears in the solution; separating the precipitation from the solution; adding a base to the filtrate until an alkaline pH is obtained; and separating the purified phenanthroline from the solvent.

Substituted 1,10-phenanthrolines are utilized as analytical reagents for the determination of metals and as oxidation-reduction indicators.

---

This is a continuation-in-part of application Ser. No. 310,934, filed Sept. 23, 1963, now abandoned.

This invention relates to a process for the purification of 1,10-phenanthroline and substituted 1,10-phenanthrolines. More specifically, this invention is concerned with the purification of alkyl or aromatic substituted 1,10-phenanthrolines from the impurities present in a phenanthroline preparative reaction mixture.

Phenanthrolines, and particularly 1,10-phenanthrolines are used as analytical reagents for the determination of metals, and in the form of metal complexes as oxidation-reduction indicators. Metal complexes of 1,10-phenanthrolines are also used to combat infection in humans, animals and plants.

Crude 1,10-phenanthrolines are usually obtained by a Skraup reaction or a modified or related Skraup reaction, which involves heating a primary aromatic amine, having at least one unsubstituted ortho position, with glycerol, sulfuric acid and an oxidizing agent. When the aromatic amine is a monoamine the resultant compound is a quinoline, substituted in the aromatic portion of the quinoline nucleus. The reaction of an aromatic diamine with two moles of glycerol yields 1,10-phenanthroline with the substitutions in the 5- and/or 6-position.

A more efficient method of preparing 1,10-phenanthrolines is to first prepare the 8-amino quinoline and then react this under Skraup reaction conditions.

To substitute the quinoline or phenanthroline in the heterocyclic rings, a modified Skraup reaction is used in which an α,β-unsaturated ketone, such as substituted acroleins, vinyl ketones and the like, is used in place of the glycerol. In view of the ease by which α,β-unsaturated ketones polymerize under Skraup reaction conditions, it has been found expedient to employ compounds which produce α,β-unsaturated ketones or aldehydes, in situ, under the reaction condition of a Skraup reaction.

Various modifications of the Skraup reaction, especially when an 8-aminoquinoline is the starting product, have been used. These modifications include the use of phosphoric acid in place of the sulfuric acid (Yale modification); the addition of moderating agents, such as ferrous sulfate, acetic acid or boric acid; the use of dilute sulfuric acid; azetropical removal of water during the reaction; and changes in the order of mixing the reactants.

The various oxidizing agents used include, but is not limited to, nitro compounds, arsenic pentoxide, ferric oxide, ferric sulfate, ferric chloride, stannic chloride and the like.

Substituted 1,10-phenanthroline compounds which can be purified by the process of this invention are those of the formula:

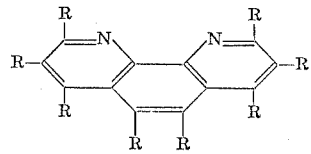

wherein R is selected from the group consisting of alkyl, phenyl, tolyl, xylyl and hydrogen. When the substituent is alkyl there can be a maximum of six substitute positions, the remaining R's being hydrogen. The total carbon atoms of the substituents is limited to a maximum of 12 carbon atoms. When the substituent is phenyl, tolyl or xylyl there can be a maximum of two substitute positions and the remaining R's being hydrogen.

1,10-phenanthroline compounds which have been purified by this process include, but is not limited to, 1,10-phenanthroline, 2,9-dimethyl-1,10-phenanthroline, 3,6,8-tri-n-butyl-1,10-phenanthroline, 2,4,7,8-tetramethyl - 1,10-phenanthroline, 2,4,7,9-tetramethyl-1,10 - phenanthroline, 3,4,7,8-tetramethyl-1,10 - phenanthroline, 3,5,6,8 - tetramethyl-1,10-phenanthroline, 3,8-di-n-butyl-5,6 - dimethyl-1,10-phenanthroline, 3,4,5,6,7,8-hexamethyl - 1,10 - phenanthroline, 5-phenyl-1,10 - phenanthroline and 4,7 - diphenyl-1,10-phenanthroline.

In the preparation of 1,10-phenanthroline metal complexes, either in an analytical procedure, or for use as an indicator or to combat infection, it is essential that the phenanthroline base be in a pure form. Purity of the base is judged by the melting point and color of the base, the melting point being as close as possible to the optimal, and the color as close as possible to the minimal.

Commercially available phenanthrolines are heavily colored and must be purified prior to formation of the metal complexes. The usual method of purification described in the literature is by repeated recrystallization from benzene. This method, however, is not an efficient or practical procedure since the solubility of many 1,10-phenanthrolines in benzene is low and many recrystallizations are required to obtain satisfactory melting points. Reduction of the color, in benzene, to give a white 1,10-phenanthroline is almost impossible.

It has been found that the color and melting point of the crude 1,10-phenanthroline base can be materially improved by (1) dissolving the crude phenanthroline base in an organic acid solution, having a dissociation constant of from about $1 \times 10^{-4}$ to $1 \times 10^{-6}$, at 25° C.; (2) partially neutralizing this solution by addition of a base until slight permanent precipitation appears in the solution; (3) separating this precipitate from the solution; (4) addition of a base to the filtrate until an alkaline pH is obtained; and (5) separating the purified phenanthroline, which precipitated when the filtrate was made alkaline, from the solvent.

The organic acids conveniently used in this process include acetic acid, formic acid, propionic acid, and the like, with acetic acid and aqueous acetic acid being the preferred acid.

The base used is an inorganic carbonate or hydroxide, preferably an alkali metal or alkaline earth carbonate or hydroxide, such as sodium hydroxide, or ammonium hydroxide.

The amount of base that is added to partially neutralize the solution is determined by visual observation of the mixture. Base is added until a permanent precipitate appears, that is, a precipitate which does not redissolve on stirring. It has been observed that during this partial neutralization procedure the pH of the solution varies only slightly from about pH 5 to about pH 6 and that more base is required than the calculated amount for neutralization of the free weak acid. Following this procedure it was observed that most of the impurities, especially the colored impurities are precipitated by this partial neutralization.

Temperature is not critical during either the partial neutralization or final neutralization steps. Partial neutralization is usually at a temperature of about 15 to 50° C. and the final neutralization is at 60° C. A temperature of 60° C. is preferred for the final neutralization to increase the crystal size of the product and thus facilitate filtration of the product. The product is washed with water and dried.

The separation of the impurities from solution, after partial neutralization, can be conveniently performed by filtration. Prior to filtration an adsorbent, such as carbon, and/or a filter aid such as "Celite" can be added to the mixture.

The phenanthroline base obtained by this process may be washed or triturated with an aromatic hydrocarbon solvent, following the water wash, to remove any oily impurities. Solvents such as benzene, toluene, xylenes, cumenes, pseudocumenes, mesitylene or mixtures thereof can be utilized. The product can also be recrystallized from a lower aliphatic alcohol, such as methanol, ethanol, isopropanol, n-butanol, isobutanol, secondary butanol, tertiary butanol or mixtures of these alcohols.

The process of this invention can be utilized to obtain purified 1,10-phenanthroline from the crude commercial product as well as from the reaction of an 8-amino quinoline with a β-hydroxy ketone or aldehyde or the corresponding α,β-unsaturated compound under Skraup reaction conditions according to the following equation:

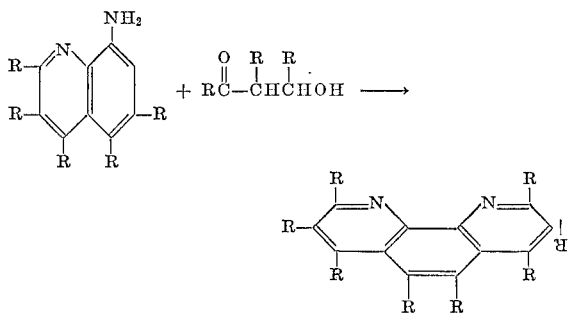

wherein R is alkyl, phenyl, tolyl, xylyl or hydrogen as previously defined. The alkyl groups are preferably limited to groups having a maximum of 4 carbon atoms.

The 8-amino quinolines are conveniently prepared from the corresponding o-nitroaniline and a β-hydroxy ketone or aldehyde under Skraup reaction conditions. Procedures for nitration of substitute anilines to yield mainly ortho nitro anilines, such as nitration of substituted acetanilides in acetic acid or with acetyl nitrate, are well known.

The 8-nitroquinoline is prepared by adding with efficient stirring, a hydroxy carbonyl compound or its corresponding α,β-unsaturated compound to a mixture of the o-nitroaniline, arsenic acid and either sulfuric or phosphoric acid at a temperature in the range of about 115–130° C and preferably in the range of about 120–125° C. The acids are the normal acids of commerce, such as 98% sulfuric acid, 85–90% phosphoric acids and 80% arsenic acid. These concentrations do not have to be used. It is preferred that the reaction mixture contains about 10% water for the preparation of 8-nitroquinolines and therefore the commercial form of the acids are convenient sources.

The ratio of arsenic acid to phosphoric acid or sulfuric acid is in the range of about 1:1 to 1:15. The preferred range for arsenic acid/sulfuric acid is about 1:1 to 1:5, and the preferred range for arsenic acid/phosphoric acid is about 1:5 to 1:15.

Addition of the carbonyl compound to the amine should be slow and with efficient stirring to prevent accumulation of the carbonyl compound and any sudden temperature rise thus reducing the possibility of self condensation of the carbonyl compound.

Upon completion of addition of the carbonyl compound the reaction mixture is heated at a temperature up to about 135 to 140° C. for about one to two hours.

The desired 8-nitroquinoline is isolated from the reaction mixture by quenching the mixture with water, filtering if desired, and making the mixture alkaline to precipitate the 8-nitroquinoline. Other known isolation procedures can also be used. Purification is by known recrystallization procedures which yields a satisfactory product in most cases.

The 8-nitroquinolines thus produced is reduced to the corresponding 8-aminoquinoline by a reaction with an ammonium, alkali metal or alkaline earth hydrogen sulfide at about pH of 8.0 to 9.5. The reduction is carried out in an aliphatic alcohol solvent medium, at reflux or near reflux temperature. Reaction temperature should be at least above 50° C.

Maintaining a pH of about 8.0 to 9.5 throughout the reduction increases the yield of 8-aminoquinolines by about 15 to 30% over that obtained without this pH control.

The aliphatic alcohol solvent has a maximum of 4 carbon atoms and is preferably water-miscible. Alcohols, such as methanol, ethanol, n-propanol, isopropanol, t-butanol, glycols and the like are examples of alcohols which can be used as solvents. Ethanol is the preferred solvent.

The hydrogen sulfide salt, which is preferably sodium, calcium or potassium hydrogen sulfide or a solution of hydrogen sulfide in ammonia, is present in a ratio of about 3 to 4 moles per mole of nitroquinoline.

Sodium hydrogen sulfide, which is the preferred reducing agent, can be used alone without controlling the pH of the mixture, however as previously stated improved yields are obtained when the pH is in the range of about 8.0 to 9.5.

In the reduction of the nitroquinolines, the hydrogen sulfide salt is added as a solid or in an aqueous or alcohol-aqueous solution to a solution or slurry of the nitroquinoline in the alcohol solvent, and the pH adjusted and maintained throughout the reaction, at about 8.0 to 9.5. Control of pH is by any of the conventional methods, such as presence of weak base and strong acid, acid salt, or continuous controlled addition of a strong or weak acid.

As an alternative, the nitroquinoline can be added to the hydrogen sulfide salt in water, alcohol or an aqueous-alcohol mixture.

Following the reduction, the mixture is filtered and the product isolated from the alcoholic solution by concentration of the solution or by dilution with water. Other conventional methods of isolation and purification can be used.

The following examples are illustrative only of the invention and are not limiting:

Example I

Wet, crude 3,4,7,8 - tetramethyl - 1,10 - phenanthroline (180 g. dry weight) was stirred with 1260 ml. of 5% w./w. acetic acid and insoluble materials were separated by filtration.

The solution was partially neutralized by adding 40% sodium hydroxide solution dropwise, with stirring, at room temperature until a slight permanent precipitate had been formed. Animal charcoal (5 g.) was added and after stirring for ten minutes, the solution was filtered, heated to 60° C. and made alkaline with sodium hydroxide solution. The precipitated phenanthroline was filtered off, washed with water, and dried. The pale fawn solid has M.P. 270–271° C. The solid was stirred with benzene (1 volume) at 25° C., filtered, and crystallized from methanol. The pale cream solid had M.P. 280° C.

Example II

The procedure of Example I was repeated with crude 3,5,6,8-tetramethyl-1,10-phenanthroline, made by the reaction of 3,5,6 - trimethyl - 8 - aminoquinoline and methacrolein diacetate. The product obtained had M.P. 263–264° C. (Case, J.A.C.S., 1948, 70, 3996 give M.P. 260–261° C.) and was pale cream in color.

Example III

A commercial sample of 1,10-phenanthroline hydrate, a brown solid, M.P. 90° C., was treated with dilute acetic acid and sodium hydroxide solution as described in Example I, but the final benzene washing and crystallization stages were omitted. The recovered solid had the original M.P., but the color was improved to a pale cream color.

Example IV

Crude 2,9 - dimethyl - 1,10 - phenanthroline (105 g.) made from the reaction of 2 - methyl - 8 - aminoquinoline with crotonaldehyde was slurried in water (500 ml.) at 25° C. and propionic acid was added gradually, with stirring, until nearly all the solid had dissolved. Sodium hydroxide solution was then added dropwise with stirring until a faint permanent precipitate formed (pH of solution 6.0). Carbon (1 g.) was added and the solution was filtered. The filtrate was made alkaline with ammonia, giving the purified, 2,9 - dimethyl - 1,10 - phenanthroline (101 g.) as a pale cream solid, M.P. 160–162° C. Recrystallization from 40% aqueous ethanol gave the product as almost colorless prisms of the semi-hydrate, M.P. 165° C.

Example V 630 g. of 90% phosphoric acid, 72 g. of 80% arsenic acid and 50 g. of o-nitroaniline were heated to 120° C., and 55.5 g. of 1 - hydroxy - 2 - methyl - butan - 3 - one was slowly run in, taking 45 minutes, while the temperature was held at 120° C. with efficient stirring. When the addition was complete, the temperature was raised to 135° C., and held there for two hours. The batch was cooled and quenched into water and made alkaline with concentrated ammonia solution. The product was separated by filtering, dried and recrystallized from benzene. Yield of 3,4 - dimethyl - 8 - nitroquinoline was 41 g. (56%) melting at 150–152° C. In comparison, Case (J.A.C.S. 71 1828 (1949)) obtained a 23% yield, the product having a melting point 149–150° C.

Example VI

A mixture of 66.4 g. of 4,5 - dimethyl - 2 - nitroaniline, 72 ml. arsenic acid (80%) and 400 ml. (89%) phosphoric acid was heated to 115° C. and stirred. 49 g. 1-hydroxy - 2 - methyl butan - 3 - one was added dropwise keeping the temperature about 120° C. The reaction mixture was heated for two hours. The product was isolated as in Example V to yield 3,4,5,6 - tetramethyl - 8 nitroquinoline, previously unknown, in 35% yield, melting point, on recrystallization 210° C. Microanalysis gave the following results:

$C_{13}H_{14}N_2O_2$ requires: C, 67.80; H, 6.13; N, 12.17. Found: C, 67.56; H, 5.91; N, 12.08.

Example VII

Ammonium chloride (53.5 gm., 1 mole) was dissolved in water (160 ml.) and 27% ammonium hydroxide solution (70 ml., 1 mole) was added. Hydrogen sulfide was bubbled into the solution until it was saturated, 24.8 gm. or 0.73 mole being adsorbed.

3,4-dimethyl-8-nitroquinoline (5.05 gm. 0.025 mole) was slurried in ethanol (50 ml.) and heated to 60–70° C. The $NH_3/NH_4Cl/H_2S$ solution as prepared above (38 ml., containing 0.1 mole $H_2S$) was added over 10 minutes, the mixture at 60–70° C. stirred for 2 hours, filtered hot and the ethanol boiled off and replaced with water. The lumpy solid obtained was isolated and redissolved in hot ethanol and a solution of $Na_2S.9H_2O$ (4 gm.) in water (10 ml.) was added. The mixture was held at 60–70° C. for 15 minutes then hot water was added to precipitate the product. The suspension was cooled, filtered and washed to give pale yellow crystals of 3,4 - dimethyl - 8 - aminoquinoline, (4.1 gm. 96% yield) M.P. 97–99° C.

Example VIII 3,4 - dimethyl - 8 - nitroquinoline (5.05 gm., 0.025 mole) was slurried in ethanol (50 ml.) and ammonium chloride (10.7 gm., 0.2 mole) was added. The mixture was heated to 60–70° C. and 30% sodium hydrosulfide solution (15 ml., 0.1 mole) was added over 30 minutes. The mixture was held at 60–70° C. for two hours and then worked up as before to give 3,4 - dimethyl-8-aminoquinoline (4.0 gm., 93% yield) M.P. 96–98° C.

Example IX

Example VIII was repeated except that $NaH_2PO_4$ (31.2 mg., 0.2 mole) was used in place of ammonium chloride. 3.5 gm. (77% yield) of 3,4 - dimethyl-8-aminoquinoline- M.P. 98–99° C. was obtained.

Example X

For comparison with the above, in which the pH of the reaction mixture was controlled, Example VIII was repeated but omitting the ammonium chloride. A yield of 2.8 gm. (65%) M.P. 97–99° C. was obtained.

Aminoquinolines prepared as described above can then be converted into corresponding 1,10-phenanthrolines by adopting the same processing steps as described above both broadly and in detail with respect to the conversion of o-nitroanilines into 8-nitroquinolines.

Example XI 213 ml. of 98% sulfuric acid, 107 ml. of 80% arsenic acid and 172 g. of 3,4-dimethyl-8-aminoquinoline were heated to 120° C., 153 g. of 1-hydroxy-2-methyl-butan-3-one was run in over 45 minutes, while the temperature was held at 120° C., with efficient stirring. At the end of the addition, the temperature was raised to 135° C., and held for two hours. The batch was cooled and quenched with water, filtered and the filtrate made alkaline with sodium hydroxide solution. When purified as described herein, a yield of 57% of 3,4,7,8-tetramethyl-1,10-phenanthroline was obtained. This is in contrast with a yield of 20.2% obtained by Case (J.A.C.S. 71 1828 (1949)).

Example XII 5-phenyl-1,10-phenanthroline was prepared from 6-phenyl-8-aminoquinoline and acrolein according to the procedure of Example XI.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:
1. A process for purifying crude 1,10-phenanthrolines from Skraup-type reaction mixtures, said 1,10-phenanthrolines having the forumla:

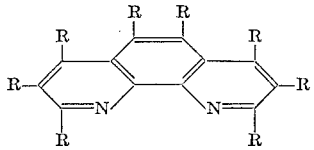

wherein R is selected from the group consisting of alkyl, phenyl, tolyl, xylyl and hydrogen; provided that when R is alkyl there is a maximum of six substituents the remaining R's being hydrogen; provided that when R is alkyl the total carbon atoms of the substituents is a maximum of 12 carbon atoms; provided that when R is phenyl, tolyl or xylyl, there is a maximum of two substituents, the remaining R's being hydrogen which comprises:
(a) dissolving the crude 1,10-phenanthroline in an organic acid having an approximate dissociation constant in the range of about $1 \times 10^{-4}$ to $1 \times 10^{-6}$ at 25° C.;
(b) adding a base selected from the group consisting of alkali metal hydroxides, alkali metal carbonates, alkaline earth hydroxides and ammonium hydroxide to the 1,10-phenanthroline-acid solution obtained in step (a) to obtain a slight permanent precipitate;
(c) separating the precipitate obtained in step (b) from the solution;
(d) adding a base selected from the group consisting of alkali metal hydroxides, alkali metal carbonates, alkaline earth hydroxides and ammonium hydroxide to the solution obtained in step (c) to obtain an alkaline pH and precipitate 1,10-phenanthroline;
(e) separating the 1,10-phenanthroline from the alkaline solution.

2. A process for purifying crude 1,10-phenanthrolines, in accordance with claim 1, wherein said organic acid is selected from the group consisting of formic acid, acetic acid and propionic acid.

3. A process for purifying crude 1,10-phenanthrolines, in accordance with claim 2, wherein said organic acid is acetic acid.

4. A process for purifying crude 1,10-phenanthrolines, in accordance with claim 3, wherein said base is sodium hydroxide.

5. A process for purifying crude 1,10-phenanthroline, in accordance with claim 1, wherein said 1,10-phenanthroline is selected from the group consisting of 2,9-dimethyl-1,10-phenanthroline, 3,6,8,-tri-n-butyl-1,10-phenanthroline, 2,4,6,8-tetramethyl-1,10-phenanthroline, 3,4,7,8 - tetramethyl-1,10-phenanthroline, 3,5,6,8-tetramethyl-1,10,-phenanthroline, 3,4,5,6,7,8-hexamethyl-1,10-phenanthroline, 3,8-di-n-butyl-1,10-phenanthroline, and 5-phenyl-1,10-phenanthroline.

References Cited
UNITED STATES PATENTS 2,640,380  6/1953  Druey et al. _____ 260—288
2,651,639  9/1953  Wheeler _____ 260—288

NICHOLAS S. RIZZO, Primary Examiner.

D. G. DAUS, Assistant Examiner.